(12) United States Patent
Everman et al.

(10) Patent No.: US 12,515,082 B2
(45) Date of Patent: Jan. 6, 2026

(54) RESPIRATION SYSTEM AND METHOD OF USE

(71) Applicant: GMECI, LLC, Beavercreek, OH (US)

(72) Inventors: Bradford R. Everman, Haddonfield, NJ (US); Brian Scott Bradke, Brookfield, VT (US)

( * ) Notice: Subject to any disclaimer, the term of this patent is extended or adjusted under 35 U.S.C. 154(b) by 983 days.

(21) Appl. No.: 17/536,867

(22) Filed: Nov. 29, 2021

(65) Prior Publication Data

US 2022/0080229 A1     Mar. 17, 2022

Related U.S. Application Data

(63) Continuation-in-part of application No. 17/501,653, filed on Oct. 14, 2021, and a continuation-in-part of
(Continued)

(51) Int. Cl.
*A62B 18/02*       (2006.01)
*A62B 18/10*       (2006.01)

(52) U.S. Cl.
CPC ............ *A62B 18/025* (2013.01); *A62B 18/10* (2013.01)

(58) Field of Classification Search
CPC ....... A62B 18/025; A62B 18/10; A62B 18/02; F16K 31/046; F16K 31/047; F16K 31/0675; F16K 31/44; F16K 2200/304
See application file for complete search history.

(56) References Cited

U.S. PATENT DOCUMENTS 10,342,942 B2    7/2019  Tatkov et al.
10,537,279 B2    1/2020  Bassin
(Continued)

FOREIGN PATENT DOCUMENTS

DE    102014012792 A1    3/2016
EP         0875258 B1    11/2004
(Continued)

OTHER PUBLICATIONS

"Solenoid." Merriam-Webster.com Dictionary, Retrieved on Feb. 3, 2025. Retrieved from Internet: <https://www.merriam-webster.com/dictionary/solenoid> (Year: 2025).*
(Continued)

*Primary Examiner* — Kendra D Carter
*Assistant Examiner* — Jaeick Jang
(74) *Attorney, Agent, or Firm* — Caldwell Intellectual Property Law

(57) ABSTRACT

Aspects relate to respiration system and a method of use. An exemplary system includes a face mask configured to substantially seal a chamber about a nose and mouth of a user, an exhalation system in fluidic communication with the face mask and configured to permit flow of expirate from the user, wherein the exhalation system additionally includes a valve selectively permitting fluidic communication with the chamber as a function of chamber pressure and an actuator operatively connected to the valve, a respiration sensor configured to detect a respiration parameter associated with a respiration phenomenon, and a computing device in communication with the actuator and the respiration sensor, wherein the computing device is configured to receive the respiration parameter and control the actuator.

16 Claims, 12 Drawing Sheets

Related U.S. Application Data application No. 17/333,169, filed on May 28, 2021, said application No. 17/501,653 is a continuation-in-part of application No. 16/933,680, filed on Jul. 20, 2020, now Pat. No. 11,172,845.

(56) References Cited

U.S. PATENT DOCUMENTS

| | | | |
|---|---|---|---|
| 2010/0139658 A1* | 6/2010 | Wenzel | A62B 7/14 128/204.22 |
| 2010/0308243 A1* | 12/2010 | Bedingfield | A61M 39/28 251/129.15 |
| 2014/0216473 A1* | 8/2014 | Dwyer | A62B 18/025 128/863 |
| 2014/0261405 A1* | 9/2014 | Tekelenburg | A62B 9/02 128/201.19 |
| 2015/0000662 A1* | 1/2015 | Williams | F16K 31/0675 700/282 |
| 2016/0256660 A1 | 9/2016 | Austin et al. | |
| 2017/0266400 A1* | 9/2017 | McCarthy | A61M 16/06 |
| 2018/0078798 A1* | 3/2018 | Fabian | A62B 18/10 |
| 2019/0175962 A1* | 6/2019 | Su | A61M 16/026 |
| 2019/0298947 A1 | 10/2019 | Trivikram | |
| 2020/0338289 A1 | 10/2020 | Schwaibold et al. | |
| 2021/0236754 A1 | 8/2021 | Feldhahn et al. | |
| 2021/0299379 A1 | 9/2021 | Merchia | |
| 2022/0088424 A1* | 3/2022 | Mikaelian | A61M 16/202 |

FOREIGN PATENT DOCUMENTS

| | | |
|---|---|---|
| WO | 2020171720 A1 | 8/2020 |
| WO | 2021183903 A1 | 9/2021 |

OTHER PUBLICATIONS

Lodon Health Sciences Center, Mechanical Ventilator, Nov. 16, 2021.

\* cited by examiner

RESPIRATION SYSTEM AND METHOD OF USE

CROSS-REFERENCE TO RELATED APPLICATIONS

This application is a continuation-in-part of Non-Provisional application Ser. No. 17/333,169 filed on May 28, 2021 entitled "SYSTEMS AND METHODS FOR INSPIRATE SENSING TO DETERMINE A PROBABILITY OF AN EMERGENT PHYSIOLOGICAL STATE" and is a continuation-in-part of Non-provisional application Ser. No. 17/501,653 filed on Oct. 14, 2021 entitled "COMBINED EXHALED AIR AND ENVIRONMENTAL GAS SENSOR APPARATUS," which is a continuation-in-part of Non-provisional application Ser. No. 16/933,680 filed on Jul. 20, 2020 of the same title; the entirety of each application is incorporated herein by reference.

FIELD OF THE INVENTION

The present invention generally relates to the field of physiological sensing devices. In particular, the present invention is directed to a respiration system and method of use.

BACKGROUND

Field respiration equipment for pilots, firefighters, and the like is essential for safety and effective performance. However, its use is often burdensome and overtime respiration alone can exhaust a user of the respiration equipment.

SUMMARY OF THE DISCLOSURE

In an aspect, a respiration system includes a face mask configured to substantially seal a chamber about a nose and mouth of a user, an exhalation system in fluidic communication with the face mask and configured to permit flow of expirate from the user, wherein the exhalation system additionally includes a valve selectively permitting fluidic communication with the chamber as a function of chamber pressure and an actuator operatively connected to the valve, a respiration sensor configured to detect a respiration parameter associated with a respiration phenomenon, and a computing device in communication with the actuator and the respiration sensor, wherein the computing device is configured to receive the respiration parameter and control the actuator.

In another aspect, a method of use of respiration system for a reduced oxygen environment includes substantially sealing, using a face mask, a chamber about a nose and mouth of a user, permitting, using an exhalation system in fluidic communication with the face mask, flow of expirate from the user, wherein permitting flow additionally includes selectively permitting, using a valve having an actuator operatively connected to the valve, fluidic communication with the chamber as a function of chamber pressure and detecting, using a respiration sensor, a respiration parameter associated with a respiration phenomenon, receiving, using a computing device in communication with the actuator and the respiration sensor, the respiration parameter, and controlling, using the computing device, the actuator.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for aided respiration in a reduced oxygen environment. As used in this disclosure, a "reduced oxygen environment" is any environment with less oxygen than normally required for breathing, for instance at sea level. In some cases, a reduced oxygen environment may include environments containing thin air, such as without limitation at altitudes substantially above sea-level. In some embodiments, a reduced oxygen environment may include environment's with dramatically reduced breathable oxygen, for example under-water environments. In an embodiment, a respiration system for use in a reduced oxygen environment may be configured for use by pilots, such as military pilots who often operate at high altitude.

Aspects of the present disclosure can be used to decrease expirate pressure required of a user of respiration during exhalation. Aspects of the present disclosure can also be used to reduce fatigue of users of respiration system. This is so, at least in part, because fatigue can result from exhalation restrictions common on state-of-the-art respiration systems.

Aspects of the present disclosure allow for free (i.e., unrestricted or less restricted) exhalation of a user of respiration system. Exemplary embodiments illustrating aspects of the present disclosure are described below in the context of several specific examples.

Figure 1:
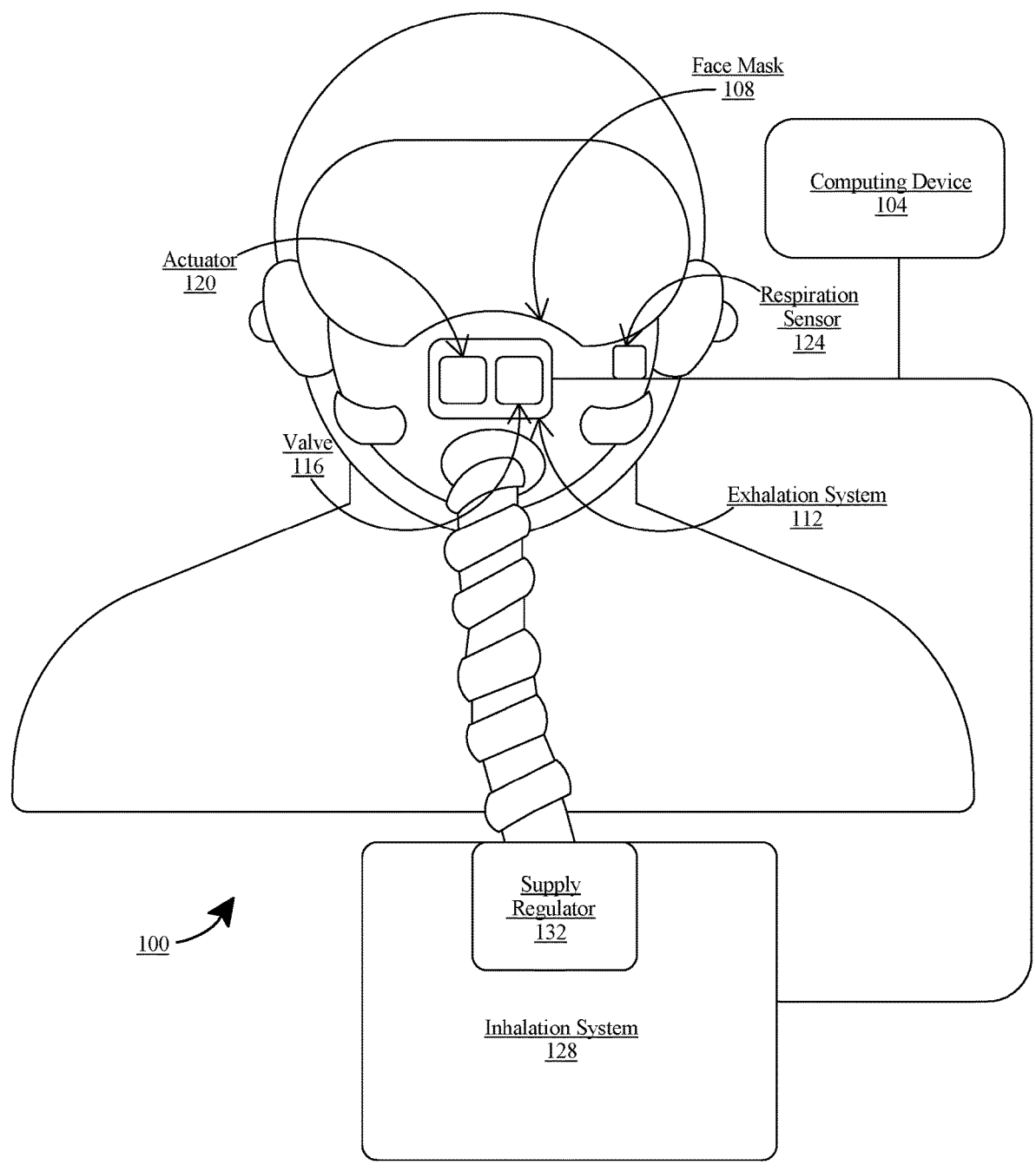
FIG. 1 is a block diagram illustrating an exemplary respiration system.

Referring now to FIG. 1, an exemplary embodiment of a respiration system 100 for use in a reduced oxygen environment is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a face mask 108. Face mask may be configured to substantially seal a chamber about a nose and mouth of a user. As used in this disclosure, an act of "sealing" is a cordoning off of one area from another; sealing may be considered non-absolute, therefore tolerated levels of leakage may be permitted when sealing. As used in this disclosure, "leakage" is an amount of material that circumvents or bypasses sealing. Commonly sealing may occur between two areas or chambers and substantially prevent fluidic communication between the two. As used in this disclosure, a "chamber" is a volume containing or capable of containing a fluid. Face mask may include any face mask described in this disclosure, including with reference to FIG. 6.

With continued reference to FIG. 1, system 100 includes an exhalation system 112. Exhalation system 112 may be in fluidic communication with face mask. As used in this disclosure, an "exhalation system" is a system that is configured to permit a flow of expirate. As used in this disclosure, "expirate" is a fluid exhaled during an exhalation of breath, such as without limitation air. Exhalation system may include any fluidic arrangement described in this disclosure, including without limitation hoses, plenums, valves, manifolds, and the like. Exhalation system may include components described in detail with reference to FIGS. 4-7.

With continued reference to FIG. 1, exhalation system 112 may include a valve 116. As used in this disclosure, a "valve" is a device that selectively permits or affects fluidic communication. Valve 116, in some cases, may be a component that controls fluidic communication between two or more components. Exemplary non-limiting valves include directional valves, control valves, selector valves, multi-port valves, check valves, and the like. Valves may include any suitable valve construction including ball valves, butterfly valves, needle valves, globe valves, gate valves, wafer valves, regulator valves, and the like. Valves may be included in a manifold of hydraulic or pneumatic circuit, for example allowing for multiple ports and flow paths. Valves may be actuated by any known method, such as without limitation by way of hydraulic, pneumatic, mechanical, or electrical energy. For instance, in some cases, a valve may be actuated by an energized solenoid or electric motor. Valve actuators and thereby valves themselves, may be controlled by computing device 104. Computing device 104 may be in communication with valve, for example by way of one or more of electrical communication, hydraulic communication, pneumatic communication, mechanical communication, and the like. In some cases, controller 104 may be in communication with one or more components (e.g., valve, pump, sensors, and the like) by way of one or more networks, including for example wireless networks and controller area networks (CANs).

In some cases, valve 116 may be configured to selectively permit fluidic communication with chamber inside face mask 108. For example, in some cases, valve 116 may be configured to operate as a function of chamber pressure. As used in this disclosure, "chamber pressure" is pressure of chamber within face mask 108; chamber pressure may be directly measured or inferred, for example from indirect measurement of pressures, forces, strains, and the like at other locations.

Still referring to FIG. 1, in some embodiments, valve 116 may include a normally-closed valve. As used in this disclosure, a "normally-closed valve" is a valve configured to interrupt fluidic communication in its default state. In some cases, valve 116 may be configured to open at a release pressure. As used in this disclosure, a "release pressure" is a pressure at or above which a valve opens, for instance, thereby releasing the pressure. In some cases, a default release pressure may be predetermined, for example through selection of a valve pre-load. In some cases, valve pre-load may be achieved through spring-loaded. For instance, in some cases, valve may be spring-loaded. As used in this disclosure, "spring-loaded" refers to use of compliant elements within a device; compliant elements include any means of potential energy storage, for example without limitation ballast, springs, capacitors, fluidic accumulators, and the like. In some cases, a compliant element for spring-loading may exert an effort (e.g., force, pressure, potential, and the like) as a function of a displacement (e.g., linear displacement, volumetric displacement, charge displacement, and the like). In some cases, spring-loading of valve may contribute to release pressure.

With continued reference to FIG. 1, exhalation system 112 may include an actuator 120. As used in this disclosure, an "actuator" is a device that is configured to produce an effort (e.g., force, torque, pressure, potential and the like) or a flow (e.g., velocity, volumetric flow, current and the like). Actuator 120 may be operatively connected to valve 116; for instance, actuator 120 be configured to operate the valve 116 (e.g., open the valve 116 or reduce a threshold pressure required to open the valve 116).

With continued reference to FIG. 1, an actuator 120 may include a component of a machine that is responsible for moving and/or controlling a mechanism or system. An actuator 120 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator 120 responds by converting source power into mechanical motion. In some cases, an actuator 120 may be understood as a form of automation or automatic control.

With continued reference to FIG. 1, in some embodiments, actuator 120 may include a hydraulic actuator. A hydraulic actuator may consist of a cylinder or fluid motor that uses hydraulic power to facilitate mechanical operation. Output of hydraulic actuator 120 may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

With continued reference to FIG. 1, in some embodiments, actuator 120 may include a pneumatic actuator 120. In some cases, a pneumatic actuator may enable considerable forces to be produced from relatively slight changes in gas pressure. In some cases, a pneumatic actuator may respond more quickly than other types of actuators, for example hydraulic actuators. A pneumatic actuator may use compressible flued (e.g., air). In some cases, a pneumatic actuator may operate on compressed air. Operation of hydraulic and/or pneumatic actuators may include control of one or more valves, circuits, fluid pumps, and/or fluid manifolds.

With continued reference to FIG. 1, in some cases, actuator 120 may include an electric actuator. Electric actuator 120 may include any of electromechanical actuators, linear motors, and the like. In some cases, actuator 120 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential, electric actuator 120 may include a linear motor. Linear motors 120 may differ from electromechanical actuators, as power from linear motors is output directly as translational motion, rather than output as rotational motion and converted to translational motion. In some cases, a linear motor may cause lower friction losses than other devices. Linear motors may be further specified into at least 3 distinct categories, including flat linear motor, U-channel linear motors and tubular linear motors. Linear motors 120 may controlled be directly controlled by a control signal for controlling one or more linear motor parameters. Exemplary linear motor parameters include without limitation position, force, velocity, potential, and current.

With continued reference to FIG. 1, in some embodiments, an actuator 120 may include a mechanical actuator 120. In some cases, a mechanical actuator 120 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

With continued reference to FIG. 1, in some embodiments, actuator 120 may include a solenoid. As used in this disclosure, a "solenoid" is a transducer configured to generate a controlled magnetic field to convert electrical energy into mechanical work, for example through linear displacement and force. A solenoid 120 may include an electromechanical system that uses an electromagnetic force to introduce an electrically controllable movement, for example without limitation a translational movement. In some cases, a solenoid 120 may be normally open or normally closed. Solenoid 120 may be spring loaded, such that when in a state of substantially no electromagnetic force the solenoid 120 is a predetermined position.

With continued reference to FIG. 1, system 100 may include a respiration sensor 124. As used in this disclosure, a "respiration sensor" is a device that is configured to detect a respiration parameter as a function of a respiration parameter. As used in this disclosure, a "respiration parameter" is information representative of a respiration phenomenon, for example without limitation inspirate flow rate, expirate flow rate, chamber gauge pressure, and the like. As used in this disclosure, a "respiration phenomenon" is any phenomenon associated with respiration, for example inspirate flow, expirate flow, chamber pressure and the like. Respiration sensor 124 may include one or more of an inhalation sensor 124 and an exhalation sensor 124.

Still referring to FIG. 1, as used in this disclosure, an "inhalation sensor" is a sensor configured to detect an inhalation parameter representative of a phenomenon associated with inhalation, for example without limitation inhalation of a user. Inhalation sensor 124 may include any sensor described in this disclosure. In some cases, inhalation sensor may alternatively be referred to in this disclosure as an inspirate sensor 124. Inhalation parameter may be associated with at least a portion of an inspirate. As used in this disclosure, "inspirate" is fluid inhaled during an inhalation of breath, such as without limitation air. In some embodiments, at least an inhalation parameter comprises inspirate volume. Inspirate volume may include a volume of a single inspirate and/or a flow rate of inspirate. In some embodiments, at least an inhalation parameter comprises inspirate oxygen concentration. Inspirate oxygen concentration may include any oxygen concentration measurement, including without limitation partial pressure, tidal oxygen concentration, and the like.

Still referring to FIG. 1, as used in this disclosure, a "exhalation sensor" is a sensor configured to detect an exhalation parameter representative of a phenomenon associated with exhalation, for example without limitation exhalation of a user. Exhalation sensor 124 may include any sensor described in this disclosure. Exhalation parameter may be associated with at least a portion of an expirate. In some embodiments, at least an exhalation parameter may include expirate volume. Expirate volume may include a volume of a single expirate and/or a flow rate of expirate. In some embodiments, at least an exhalation parameter may include expirate carbon dioxide concentration. Expirate carbon dioxide concentration may include any carbon dioxide concentration measurement, including without limitation partial pressure, tidal carbon dioxide concentration, and the like.

With continued reference to FIG. 1, computing device 104 is in communication with actuator 120 and respiration sensor 124. As used in this disclosure, two components are said to be "in communication" or "communicative" when substance, energy, or information can travel between them from one to another. For instance, in some cases, communication between components may be achieved by way of signals. As used in this disclosure, a "signal" is any intelligible representation of data, for example from one device to another. A signal may include an optical signal, a hydraulic signal, a pneumatic signal, a mechanical, signal, an electric signal, a digital signal, an analog signal and the like. In some cases, a signal may be used to communicate with computing device 104, for example by way of one or more ports. In some cases, a signal may be transmitted and/or received by computing device 104 for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

With continued reference to FIG. 1, computing device 104 may receive respiration parameter from respiration sensor 124, for instance as a signal. In some cases, system 100 (e.g., one or more of computing device 104 and respiration sensor 124) may perform signal processing steps, for instance on respiration parameter. System 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, computing device 104 may be configured to control actuator 120. Computing device 104 may control actuator 120 using a control signal communicated to actuator 120. Control signal may include a digital signal (e.g., TTL or UART); alternatively or additionally, control signal may include an analog signal. For instance in some cases, actuator 120 may include a solenoid and control signal may include a current. By controlling current to actuator 120, computing device 104 may control variably response of the actuator 120. Alternatively or additionally, in some cases, control signal my include a potential; and by controlling potential to actuator 120, computing device 104 may variably control response of the actuator 120. In some embodiments, computing device 104 may be further configured to variably control an actuator force exerted by actuator 120. As used in this disclosure, "actuator force" is force either exerted by or acting upon an actuator. In some cases, actuator may be configured to produce a variable amount of actuator force, for example in response to a control signal or input current, potential, energy, power, or the like.

Still referring to FIG. 1, in some embodiments, computing device 104 may be configured to control actuator 120 to reduce release pressure of valve 116. For instance, in some cases, computing device 104 may control actuator as a function of respiration parameter. In some cases, valve may include a normally-closed valve, as described above. Normally-closed valve may be configured to operate after failure of one or more of actuator 120 and computing device 104. For instance in some cases, spring-load of valve 116 may be configured to operate according to a release pressure that is normally achieved during exhalation of user without aid from actuator 120. In some cases, this configuration creates a fail-safe, allowing respiration system 100 to continue to operate even in an event of actuator 120 and/or computing device 104 failure.

Still referring to FIG. 1, in some embodiments, system may include an inhalation 128. As used in this disclosure, an "inhalation system" is a system in fluidic communication with face mask and configured to supply inhalation air. Inhalation system 128 may be in fluidic communication with and configured to supply inhalation air to face mask 108. As used in this disclosure, "inhalation air" is air supplied to user for inspiration. In some cases, inhalation air may include added oxygen, for example from an oxygen source. An amount (e.g., partial pressure) of oxygen within inhalation air may be controlled by inhalation system 128. For instance, at greater altitudes amount of added oxygen to inhalation may be increased. In some cases, inhalation system 128 may adjust oxygen content of inhalation air according to a respiration parameter from respiration sensor 124.

Still referring to FIG. 1, in some embodiments, inhalation system 128 may additionally include a supply regulator 132. As used in this disclosure, a "supply regulator" is a pneumatic device that affects one or more of flow and/or pressure of an inhalation air. In some cases, supply regulator 132 may affect inspirate pressure. As used in this disclosure "inspirate pressure" is pressure within system 100 (e.g., chamber within face mask 108) during inhalation. In some cases, computing device 104 may be further configured to control supply regulator 132 as a function of respiration parameter. For instance, in some cases, respiration parameter may indicate a user is inhaling and computing device 104 may modulate supply regulator 128 to increase inhalation air (e.g., inspirate pressure) during the user's inhalation.

Still referring to FIG. 1, in some embodiments, computing device 104 may be further configured to determine a respiratory pattern. As used in this disclosure, a "respiratory pattern" or "respiration pattern" is information representative of a respiration cycle, i.e. at least one inspiration and at least one expiration. In some cases, computing device 104 may determine respiration pattern as a function of respiration parameter. Respiratory pattern may include any respiratory pattern described in this disclosure, for example respiratory patterns represented in FIGS. 3A-D. Respiratory patterns may be used by computing device to determine a phase of respiration of a user, for example if the user is inhaling or exhaling. Additionally or alternatively, in some cases, respiratory patterns may be analyzed to determine changes in a user's breathing, which may force example indicate fatigue, discomfort or the like. In some cases, computing device 104 may adjust one or more parameters associated with control of actuator 120 in order to improve performance of respiration system 100 and decrease restriction during exhalation for user. Computing device 104 may use one or more machine learning processes. For example, computing device 104 may use a machine learning model to detect respiratory phase, respiratory pattern, or detect user fatigue. Computing device 104 may use any machine learning process described in this disclosure, including without limitation machine learning processes described in reference to FIGS. 8-10.

Figure 2:
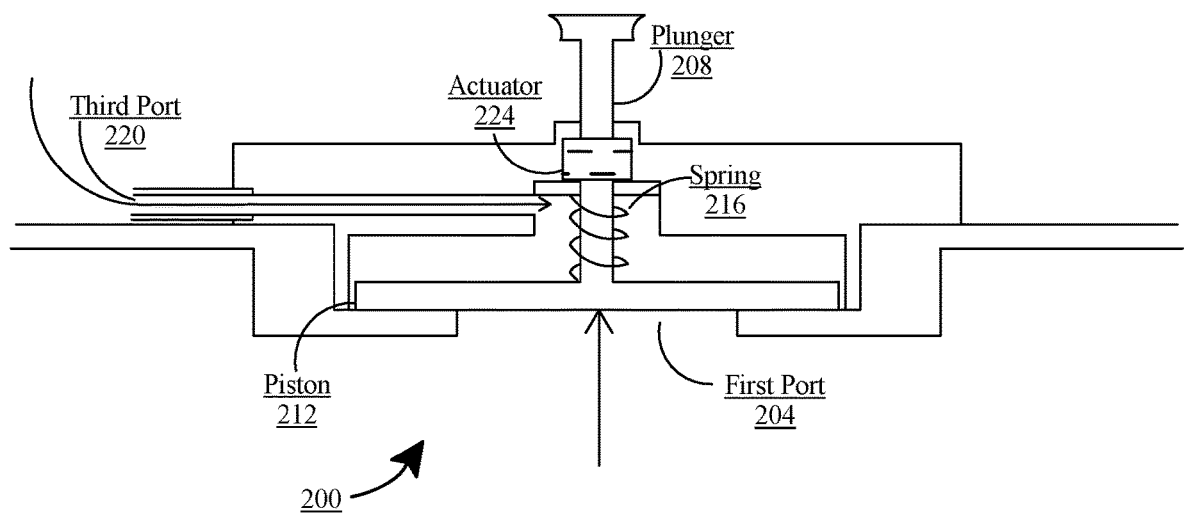
FIG. 2 is a schematic illustration of an exemplary valve.

Referring now to FIG. 2, an exemplary valve 200 is schematically illustrated in a cross-sectional view. As described above, valve 200 may be used as part of an exhalation system to permit flow of user expirate during exhalation. Likewise, valve 200 may be required to remain closed during user inhalation. For example, valve 200 may prevent inhalation air—supplied by inhalation system—from venting out of respiration system (without user breathing it first). In some cases, valve 200 may be in a fluidic path between a chamber incapsulated by face mask and a vent. Vent may be to an ambient environment (e.g., aircraft cabin). Alternatively or additionally, vent may be to a rebreathing system. Rebreathing system may allow expirate to be recirculated and reused by inhalation system. Valve 200 may include two or more ports. For example, valve 200 may have a first port 204 and a second port (not shown). Fluidic communication between first port 204 and second port may be controlled by valve 200.

With continued reference to FIG. 2, in some cases, valve 200 may include a plunger 208 that allows for controlled movement (e.g., linear displacement) of a piston 212, for instance at a first end of the plunger. In some cases, displacement of piston 212 allows for changes in fluidic communication between a first port 204 and second port (not shown). In some cases, the plunger 208 may be spring-loaded with a spring 216. In some cases, spring 216 is configured to ensure that valve 200 is normally-closed. Valve 200 may include a third port 220. Third port 220 may be configured to accept inhalation air, for example form the inhalation system. In some cases, valve 200 (e.g., spring 216) may be configured such that a pressure differential between first port 204 and third port 220 in excess of the valve's release pressure causes the valve 200 to close during inhalation and open during exhalation. Valve 200 may, therefore, passively function albeit with some added backpressure or restriction experienced by user during exhalation in order to overcome release pressure of the valve.

With continued reference to FIG. 2, in some cases, restriction experienced by user during exhalation may be reduced or eliminated with controlled operation of actuator 224. In some cases, actuator 224 may include a solenoid 224. Solenoid 224 may be configured to act upon valve 200, for instance at plunger 208. In some cases, solenoid 224 may be configured to exert an actuator force to counteract a spring force of spring 216, thereby reducing release pressure required to open valve 200, during exhalation of user. Alternatively or additionally, in some cases, actuator 224 may be configured to open valve 220 during exhalation of user.

With continued reference to FIG. 2, actuator 224 may be in communication with computing device. Computing device may be configured to control actuation (e.g., actuation force) of actuator 224. Computing device may take as input at least a respiration parameter. At least a respiration parameter may include any respiration parameter described in this disclosure. Computing device may use respiration parameter in order to determine a phase of respiration of user, e.g. inhaling, exhaling, pausing, and the like. Based upon a determined phase of respiration, computing device may control actuator 224 to reduce backpressure during exhalation by user.

Figure 3A:
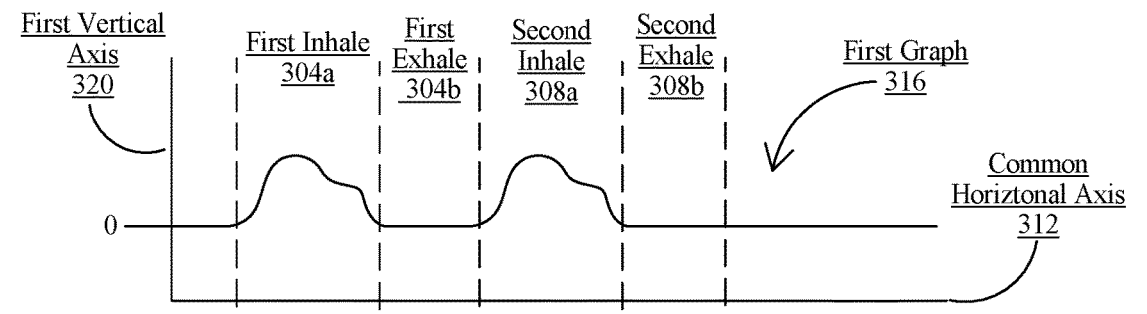
FIG. 3A is an exemplary graph of inspirate flow over time during respiration.
Figure 3B:
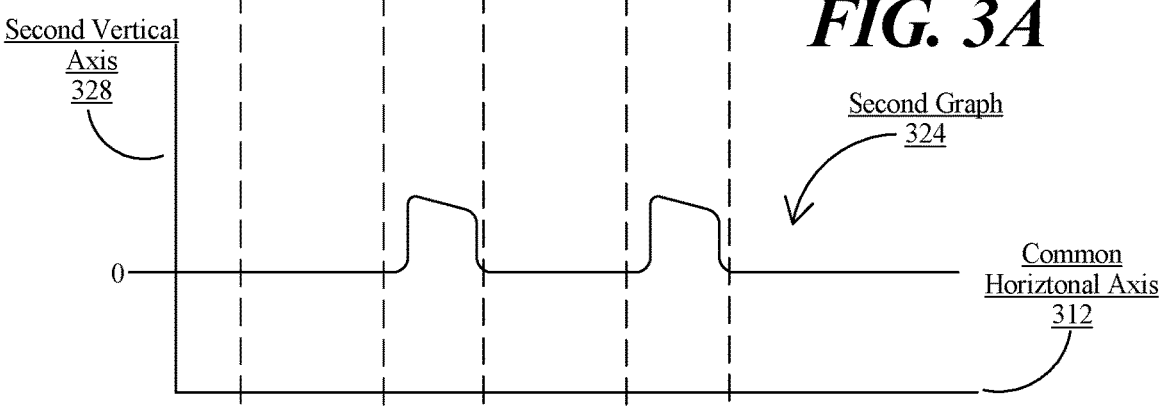
FIG. 3B is an exemplary graph of expirate carbon dioxide content over time during respiration.
Figure 3C:
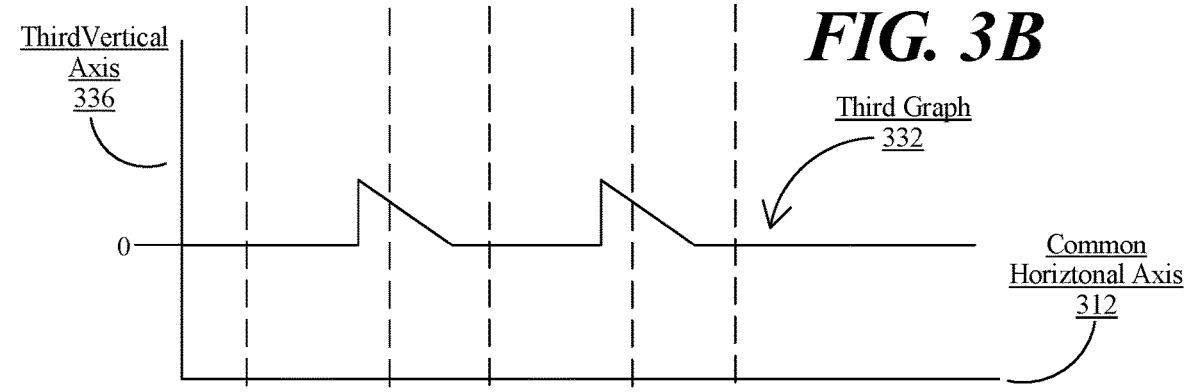
FIG. 3C is an exemplary graph of an actuator force over time during respiration.
Figure 3D:
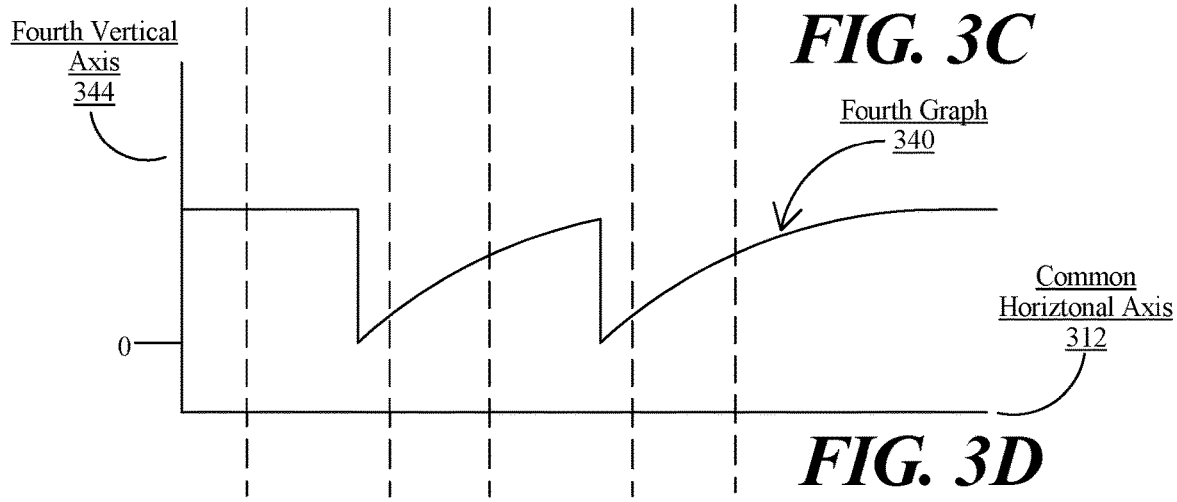
FIG. 3D is an exemplary graph of pressure difference over time during respiration.

Referring now to FIGS. 3A-D, exemplary respiration 300 is illustrated by way of graphs. FIG. 3A is an exemplary graph of inspirate flow over time during respiration. FIG. 3B is an exemplary graph of expirate carbon dioxide content over time during respiration. FIG. 3C is an exemplary graph of an actuator force over time during respiration. FIG. 3D is an exemplary graph of pressure difference over time during respiration. FIGS. 3A-D illustrate a first respiration 304a-b and a second respiration 308a-b. First respiration includes a first inhalation 304a and a second exhalation 304b. Second respiration includes a second inhalation 308a and a second exhalation 308b. FIGS. 3A-D share a common horizontal axis 312, which represents time, for example in seconds.

Referring now to FIG. 3A, a first graph 316 illustrates inhalation flow rate along a first vertical axis 320. As described throughout inhalation flow rate is a respiration parameter, which may be received by computing device, for example from respiration sensor. Inhalation flow rate may be measured using a respiration sensor, such as a flow sensor; alternatively inhalation flow rate may be inferred from data collected by another respiration sensor (e.g., pressure sensor). In some cases, inhalation flow rate may be represented in units of volume over time. Alternatively or additionally, inhalation flow rate may be represented in units of linear displacement of time (i.e., speed or velocity). As can be seen from FIG. 3A, during inhalation 204a and 208a inhalation flow rate remains positive, increasing in a beginning and then falling during an end of inhalation. As can be expected, inhalation flow rate is generally not present during exhalation 204b and 208b.

Referring now to FIG. 3B, a second graph 320 illustrates exhalation carbon-dioxide composition along a second vertical axis 324. As described throughout exhalation carbon dioxide composition is a respiration parameter, which may be received by computing device, for example from respiration sensor. Exhalation carbon-dioxide composition may be measured using respiration sensor. For example, exhalation carbon-dioxide composition may be measured by a carbon-dioxide detector located within exhalation system. Alternatively or additionally, in some cases, exhalation carbon-dioxide composition may be inferred from data collected by another respiration sensor. In some cases, exhalation carbon-dioxide composition may be represented in according to percent, parts per million, partial pressure, or the like. Exhalation carbon-dioxide composition may be represented by absolute or relative measures. As can be seen from FIG. 3B, during exhalation 204b and 208a exhalation carbon dioxide composition remains positive, increasing in a beginning and then falling during an end of exhalation. Exhalation carbon dioxide composition is generally not present during inhalation 204a and 208a.

With continued reference to FIGS. 3A-B, respiration parameters 320 and 328 may be used by computing device in order to determine a phase of respiration and/or a respiration pattern. Computing device may also use respiration parameters 320 and 328 to control actuator and/or valve. For instance, FIGS. 3C-D illustrate and exemplary actuator/valve control scheme during respiration 304a-b and 308a-b.

Referring now to FIG. 3C, a third graph 328 illustrates actuator force along a third vertical axis 332. Actuator force may be measured using a sensor, such as a strain gauge; alternatively actuator force may be inferred from data collected by another sensor (e.g., actuator encoder indicating movement of actuator, pressure sensor indicating changes in release pressure). Actuator force may also be inferred from a control signal sent to actuator, for example from computing device to control the actuator. In some cases, actuator force may be represented in units of percentage, force, pressure, and the like. Actuator force may be represented in absolute or relative measurement. As can be seen from FIG. 3C, according to an exemplary control scheme, during inhalation 204a and 208a actuator force is generally not present until a very end of the inhalation where actuator force is greatest. In some cases, computing device may control actuator in this manner to minimize release pressure or open valve at end of inhalation, allowing generally unrestricted exhalation by user. In some cases, actuator force may be controlled to ramp down during exhalation, as shown in FIG. 3C.

Referring now to FIG. 3D, a fourth graph 336 illustrates valve release pressure along a fourth vertical axis 340. Release pressure may be measured using a sensor, such as a strain gauge or a pressure sensor; alternatively actuator force may be inferred from data collected by another sensor (e.g., actuator encoder indicating movement of actuator or spring, force sensor indicating changes in spring force). Release pressure may also be inferred from a control signal sent to actuator, for example from computing device to control the actuator. In some cases, release pressure may be represented in units of percentage, force, pressure, and the like. Release pressure may be represented in absolute or relative measurement. As can be seen from FIG. 3D, according to an exemplary control scheme, during inhalation 204a and 208a release pressure is generally at a maximum value until a very end of the inhalation where actuator force is greatest 332 and release pressure is at a minimum extreme. In some cases, computing device may control actuator in this manner to minimize release pressure or open valve at end of inhalation, allowing generally unrestricted exhalation by user. In some cases, release pressure may be controlled to ramp up during exhalation, as shown in FIG. 3D. In some cases, computing device may control actuator to open valve, thereby bringing release pressure to zero. Alternatively, actuator may not open valve keeping release pressure positive during respiration.

Figure 4:
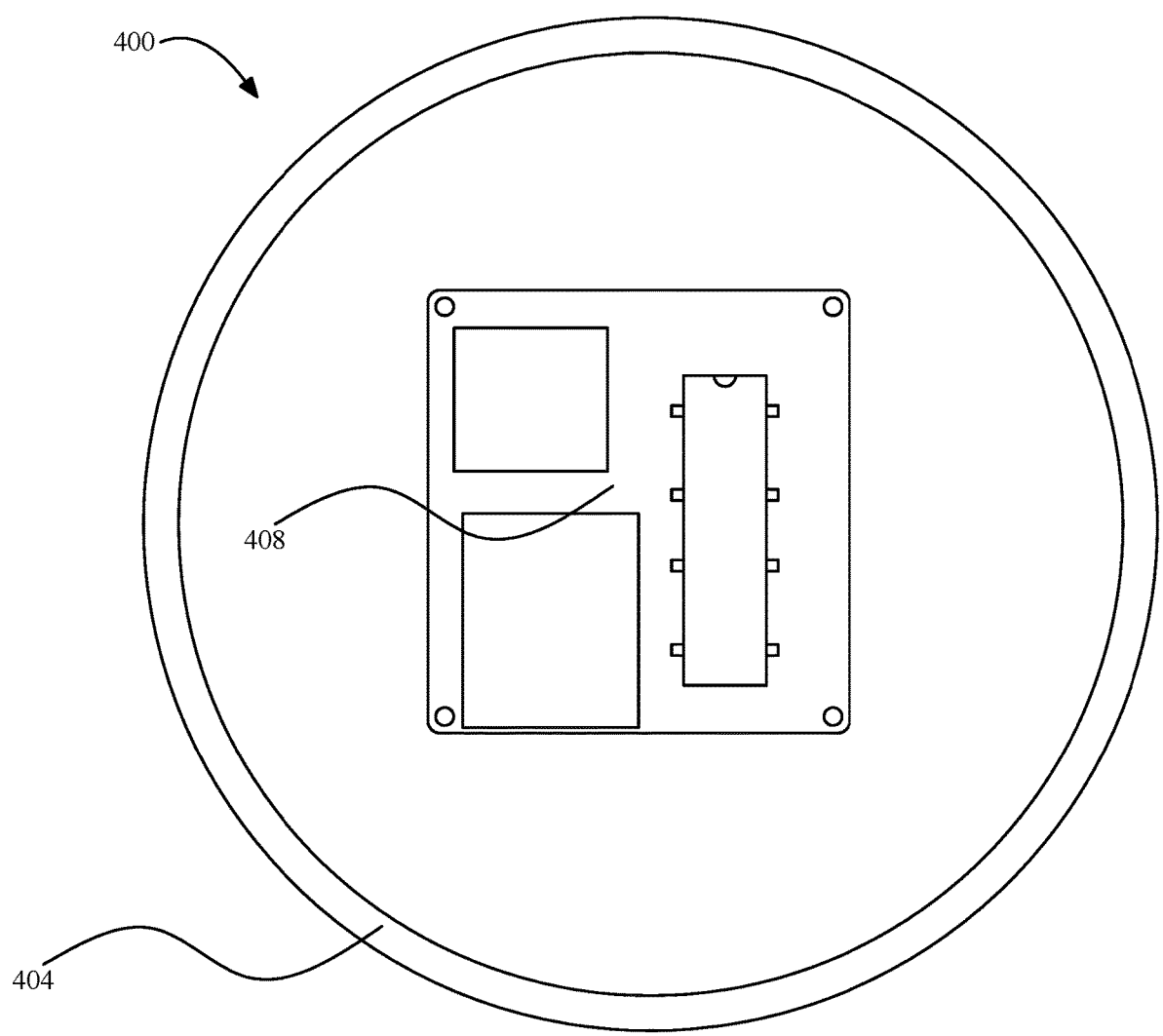
FIG. 4 is a schematic diagram illustrating an exemplary embodiment of a combined exhaled air and environmental gas sensor apparatus.

Referring now to FIG. 4, combined exhaled air and environmental gas sensor 408 apparatus 400 for mobile respiratory equipment is illustrated. Apparatus 400 includes a housing 404, within which one or more electronic components are positioned. One or more electric components include a sensor 408. Housing 404 may be constructed of any suitable material or combination of materials, including without limitation metal, metal such as aluminum, titanium, steel, or the like, plant materials including bamboo and/or wood, polymer materials such as polycarbonate, polymethyl methacrylate, acrylonitrile butadiene styrene (ABS), or the like, synthetic fibers such as carbon fiber, silicon carbide fiber, metallic fiber, or the like, composite materials such as fiberglass, laminated fiberglass, plywood, or the like, or any combination of the above. Housing 404 may be manufactured in any suitable process including molding such as injection molding, additive manufacturing such as "three-dimensional printing" and/or stereolithography, subtractive processes such as machining, and/or any other process or combination of processes. Housing 404 may include a sensor-bearing surface 412 on or to which one or more electrical components including sensor 408 may be attached. Sensor-bearing surface 412 may be positioned opposite a port aperture as described in further detail below.

Figure 5A:
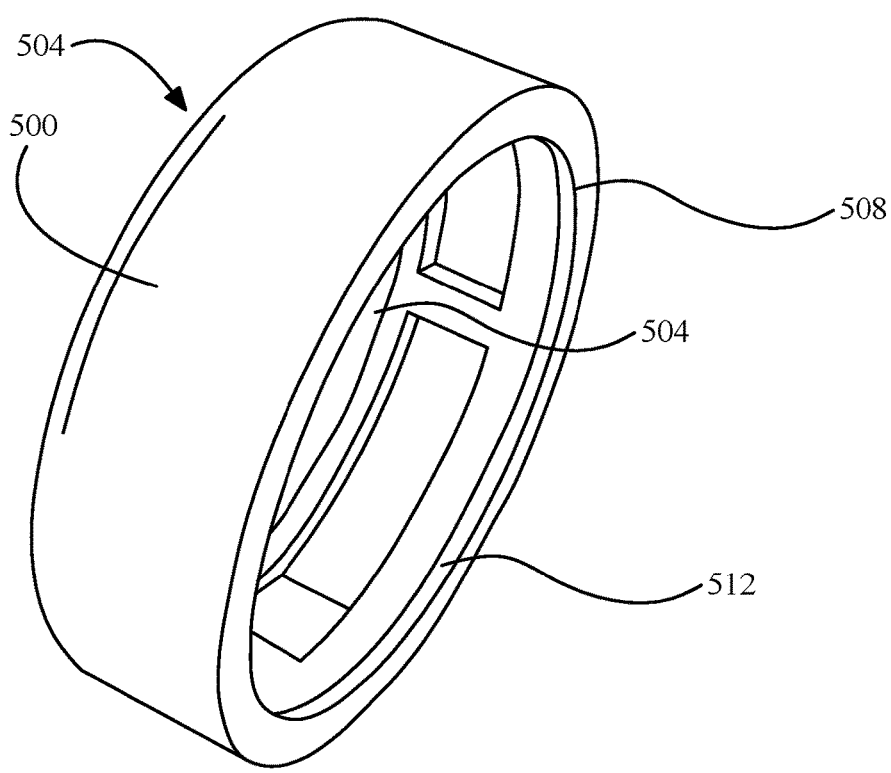
FIG. 5A is a schematic diagram illustrating an exemplary embodiment of a housing.

Referring now to FIG. 5A, a perspective view of an exemplary embodiment of a housing 404 is illustrated. Housing 404 may include an exterior surface 500, an interior surface 504, an interior space surrounded by interior surface 504, and one or more apertures. Housing 404 may have any suitable shape, including a shape of a cap to be placed over a respiratory exhaust port as described in further detail below. Housing 404 may be substantially cylindrical and may have one or more rounded edges. Housing 404 includes a port aperture 508. Port aperture 508 is an aperture that receives exhaled breath from a respiratory exhaust port as described in further detail below, admitting the exhaled breath into interior space of housing 404. Housing 404 further includes a connector 512, which may be located at port aperture 508. A "connector," as used in this disclosure, is a structural feature and/or component that affixes one aperture, opening, port, or the like to another in a way that permits flow of fluids such as liquid and/or gases to flow from one aperture, opening, port, or the like to another. Connector 512 is configured to attach port aperture 508 to exhaust port. Connector 512 may include, without limitation, a rim that fits and/or snaps over a feature of exhaust port to affix port aperture 508 thereto; connector 512 may alternatively or additionally include fastener, such as a bold or screw that inserts through a hole in housing 404 and screws into a reciprocally threaded hole in exhaust port. Connector 512 may include threading around port aperture 508 that engages reciprocal threading at exhaust port. Connector 512 may include and/or be combined with adhesives, sealants, or the like. Connector 512 may permit repeated detachment and reattachment or may effect a permanent connection between port aperture 508 and exhaust port. Persons skilled in the art, upon reviewing the entirety of this disclosure, will be aware of various alternative or additional structures and/or components that may be used for connector 512. Port aperture 508 may be located opposite sensor-bearing surface 412; for instance, sensor-bearing surface 412 may be located on interior surface 504 at a distal end of housing 404, while port aperture 508 may be located at a proximal end of housing 404.

Figure 5B:
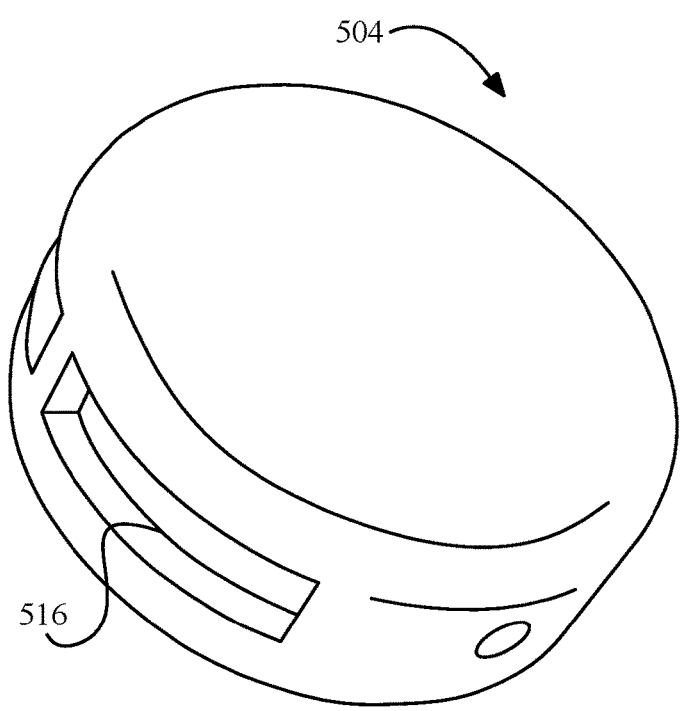
FIG. 5B is a schematic diagram illustrating an exemplary embodiment of a housing.

Referring now to FIG. 5B, housing 404 includes at least an ambient aperture 516 connecting to an exterior environment. An "exterior environment," as used in this disclosure, means air that is exterior to an element of mobile respiratory equipment as described below; for instance, where mobile respiratory equipment is a respirator mask, exterior environment may include air outside of the mask and around a person wearing the mask, as opposed to air or gas between the mask and mouth or nose of the person. At least an ambient aperture 516 includes an opening connecting interior space to exterior environment. At least an ambient aperture 516 may permit air to travel freely between interior space and exterior environment.

Figure 6:
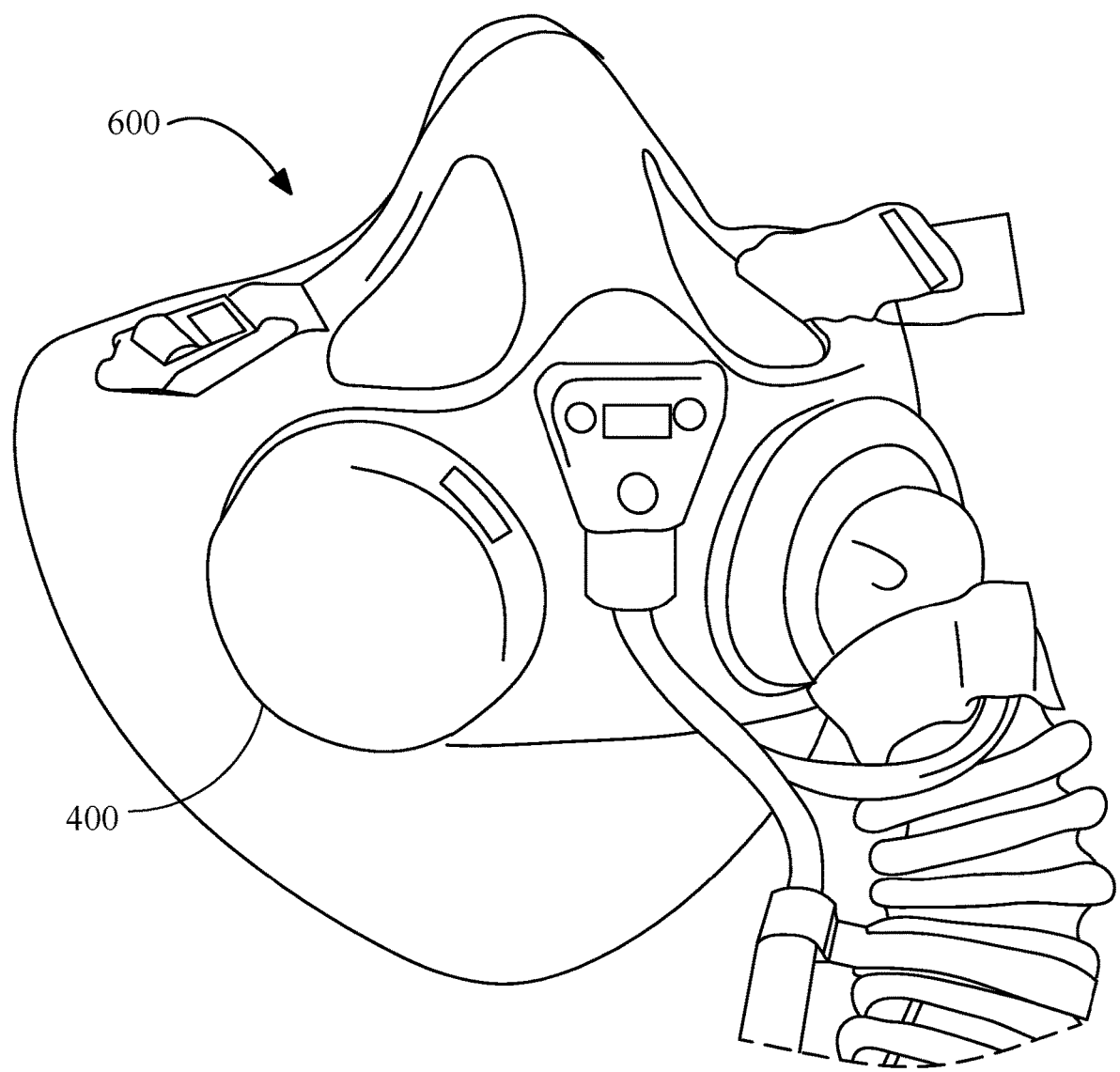
FIG. 6 is a schematic diagram illustrating an exemplary embodiment of a combined exhaled air and environmental gas sensor apparatus.

In an embodiment, and referring now to FIG. 6, housing 404 may be attached to an exhaust port of a mobile respiratory device 600. A "mobile respiratory device," as used herein, is a device worn on or about a face of a person, which aids in respiration, for instance when the person is in an environment where oxygen may be scarce or where other gases or particular matter such as carbon dioxide, carbon dioxide, toxic gases, droplets or fumes, or other elements that may interfere with respiration, and/or gases having ambient temperatures capable of harming a person when inhaled. Such an environment may include, without limitation, a cockpit of an aircraft such as a military aircraft, an artificially or naturally formed tunnel with an atmosphere that makes breathing difficult, such as an anoxic atmosphere, an atmosphere containing poisonous or otherwise problematic gases such as sulfur dioxide, carbon dioxide, carbon monoxide, or the like, a location at a high altitude such as a mountaintop, a location of a chemical spill and/or the like.

Still referring to FIG. 6, mobile respiratory device 600 may include, without limitation, a gas mask such as a cannister mask, a self-contained breathing apparatuses (SCBA) such as those used by firefighters, self-contained underwater breathing apparatuses (SCUBA), supplied-air respirators (SAR), particulate respirators, chemical cartridge respirators, powered air-purifying respirators (PAPRs), respirators included as part of a protective suit, airline respirators, N-95 or other NIOSH approved respirators, and/or other devices worn on and/or over and at least partially occluding the face to aid in respiration.

With continued reference to FIG. 6, an "exhaust port," as used in this disclosure, is an outlet that permits air exhaled by a user to escape from a mobile respiratory device 600. Exhaust port may include a valve such as a check-valve or other one-way valve to prevent air from entering a mobile respiratory device 600 from environment. Exhaust port may include, for instance, an exhale valve of a respirator mask or other such design. Exhaust port may also be an inlet port; for instance, air may be filtered while breathing in through the port and then exhaled, with or without filtering, via a valve at the same port. In operation, housing 404 with port aperture 508 and ambient aperture 516 may form a plenum in which exhaled and ambient air may flow freely by sensor 408, permitting sensation of both breath composition and environmental air composition. Further disclosure related to combined exhaled gas and environmental gas sensor may be found in U.S. patent application Ser. No. 16/933,680, entitled "COMBINED EXHALED AIR AND ENVIRONMENTAL GAS SENSOR APPARATUS," the entirety of which is incorporated herein by reference.

Referring again to FIG. 1, system 100 includes a respiration sensor 124. Respiration sensor 124 may be configured to detect one or more quantities and/or percentages of gases. In an embodiment, respiration sensor 124 may be configured to detect a carbon dioxide level and generate respiration sensor 124 outputs indicating detected carbon dioxide level. Respiration sensor 124 may alternatively or additionally detect one or more gases, droplets, particulate elements, or the like, which may be indicative of health and/or physiological status of a person using system 100, of environmental conditions that may affect such status, or both. Respiration sensor 124 may be configured to detect a carbon dioxide level by detecting a level of a related compound detecting the carbon dioxide level as a function of the level of the related compound. A "related compound," as used in this disclosure, is a compound quantities, percentages, and/or concentrations of which may be used to predict quantities, percentages, and/or concentrations of carbon dioxide in one or more contexts, owing to statistical correlations between the two. For instance, and without limitation, quantities, percentages, and/or concentrations of carbon dioxide from sources such as humans and/or other animals may be proportional to quantities, percentages, and/or concentrations of $H_2$ (hydrogen) gas and/or volatile organic compounds. In an embodiment, a related compound may be more readily or accurately detected using an electrical component of a respiration sensor 124. Respiration sensor 124 may detect a quantity, percentage, and/or concentration of a related compound such as $H_2$, volatile organic compounds, or the like and calculating an associated level of $CO_2$. Respiration sensor 124 may be configured to detect quantities, percentages, and/or concentrations of any other compound directly and/or by detection of a related compound and calculation of the quantities, percentages, and/or concentrations. Such a signal may be used to distinguish the influence of a human presence from other contaminants; for instance, in indoor environments, $H_2$ concentration may be related to $CO_2$ concentration as human breath contains significant concentrations of both, $CO_2$ (4%) and $H_2$ (10 ppm).

Still referring to FIG. 1, respiration sensor 124 may be configured to detect quantities, percentages, and/or concentrations of hydrogen gas ($H_2$). Respiration sensor 124 may be configured to sense quantities, percentages, and/or concentrations of one or more volatile organic compounds. A "volatile organic compound," as used in this disclosure, are organic compounds having high vapor pressure at room temperature. Volatile organic compounds may include without limitation, alcohols such as ethanol, isoprene, chlorofluorocarbons, benzine, methylene chloride, perchloroethylene, methyl tert-butyl ether (MTBE), and/or formaldehyde. Respiration sensor 124 may be configured to detect a total volatile organic compound (tVOC) quantities, percentage, and/or concentration. "Total volatile organic compound," as used in this disclosure, is a total concentration of volatile organic compounds present simultaneously in the air. Respiration sensor 124 may detect tVOC using a respiration sensor 124 that is sensitive to sets of volatile organic compounds, a respiration sensor 124 that is sensitive to each of a plurality of volatile organic compounds, and/or sensitive to one or more organic compounds having a quantities, percentages, and/or concentrations of which may be used to predict quantities, percentages, and/or concentrations of tVOC and/or components thereof. For instance, and without limitation, quantities, percentages, and/or concentrations of ethanol in air may be associated with quantities, percentages, and/or concentrations of other volatile organic compounds; respiration sensor 124 may be configured to detect levels and/or quantities of ethanol and calculate tVOC using such detected quantities.

With continued reference to FIG. 1, respiration sensor 124 may alternatively or additionally be configured to sense one or more hazardous gases, droplets, particulate matter or the like, including without limitation hazardous gases, droplets, particulate matter produced by indoor or outdoor air pollution sources, whether natural or anthropogenic, hazardous gases, droplets, particulate matter produced intentionally as an act of violence or war, or the like. Alternatively or additionally, respiration sensor 124 may be configured to detect one or more diagnostically useful gases, droplets, particulate matter or the like, where a "diagnostically useful" gas, droplet, and/or element of particulate matter is defined as a gas, droplet, and/or element of particulate matter that provides information usable to determine a physiological state of a user, for instance as described in further detail below.

Still referring to FIG. 1, respiration sensor 124 may function using any suitable technology, including without limitation a detector, defined as a circuit element that modifies a circuit parameter when exposed to a compound to be detected. For instance, and without limitation, respiration sensor 124 may use a heating element to temperature of a heated metal-oxide detector, such as a tin-based component that changes resistance based on exposure to a compound to be detected; output may be fed to an operational amplifier, such as without limitation an operational amplifier configured to cover a measurement range of 8 orders of magnitude. Respiration sensor 124 may include, for instance, a first such detector configured to detect $CO_2$ and/or a related compound and a second detector configured to detect tVOC and/or a representative compound such as ethanol as described above. Respiration sensor 124 may include, without limitation, input and output ports, a microcontroller for performing calculations as described above, one or more registers and/or more memory elements such as without limitation random-access memory (RAM) such as block random-access memory (BRAM), flash memory, or the like. Respiration sensor 124 may include one or more wireless transceivers or other devices for communication with other elements of apparatus 100, and/or may be wired to such elements. Respiration sensor 124 may be connected to a power source such as a battery or other voltage source.

Alternatively or additionally, and still referring to FIG. 1, respiration sensor 124 may include one or more sensors 108 and/or detectors operating according to one or more additional technologies, such as without limitation at least a chemical respiration sensor 124, which may be based on polymer or heteropolysiloxane; chemical respiration sensor 124 may be configured to detect concentrations of $CO_2$, estimated $CO_2$, tVOC, and/or any other element that may be detected by respiration sensor 124 as above.

Figure 7:
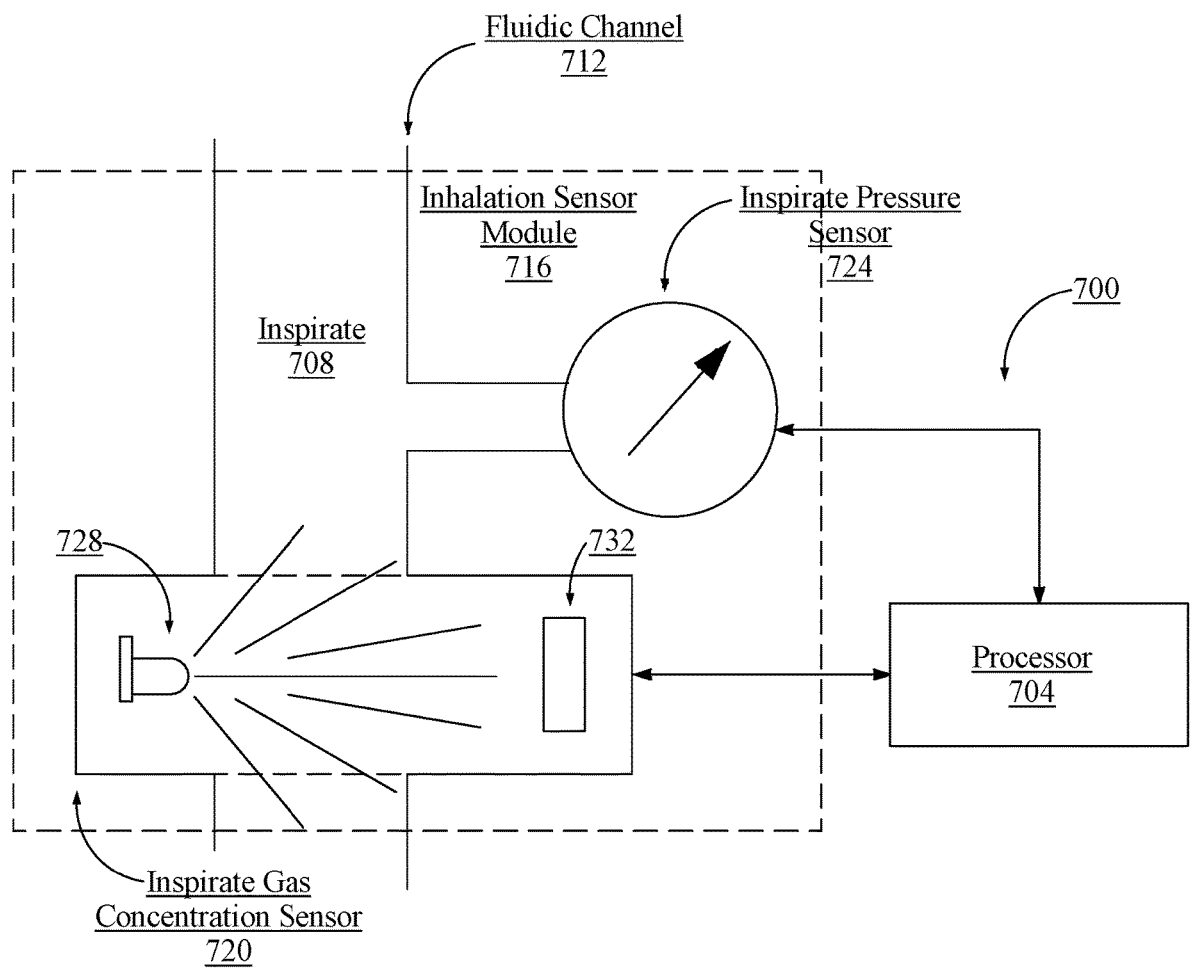
FIG. 7 is a block diagram illustrating an exemplary inhalation sensor module.

In some embodiments, one or more of at least a respiration sensor 124 may include an inspirate sensor, also referred to in this disclosure as an inhalation sensor. Referring now to FIG. 7, an exemplary inspirate sensor 700 is illustrated. In some embodiments, inspirate sensor 700 may include a processor 704 for making determinations as a function of sensed parameters associated with at least an inspirate 708, in communication with an exemplary inhalation sensor module 708. In some cases, at least a portion of an at least an inspirate 708 is contained within a fluidic channel 712. An exemplary inhalation sensor module 716 is shown in fluid communication with fluidic channel 712. In some cases, inhalation sensor module may include at least a gas concentration sensor 720. In some cases, inhalation sensor module 716 may include at least an inspirate pressure sensor 724. Inspirate gas concentration sensor 720 may include any gas concentration sensor, for instance those described in this application. In some cases, inspirate gas concentration sensor 720 may include an optical gas concentration sensor. Non-limiting optical gas concentration sensors include infrared transmission and/or absorbance spectroscopy type sensors and fluorescence excitation type sensors. Commonly, an optical gas concentration sensor may include a radiation source 728 and a radiation detector 732. In some versions, radiation source 728 may include a light source 728 that may generate a light and illuminate at least a portion of at least an inspirate 708. Radiation source 728 may generate any of a non-limiting list of lights, including coherent light, non-coherent light, narrowband light, broadband light, pulsed light, continuous wave light, pseudo continuous wave light, ultraviolet light, visible light, and infrared light. In some cases, radiation source 728 may include an electromagnetic radiation source that may generate an electromagnetic radiation and irradiate at least a portion of at least an inspirate 708. Radiation source 728 may generate any of a non-limiting list of radiations including radio waves, microwaves, infrared radiation, optical radiation, ultraviolet radiation, X-rays, gamma-rays, and light. Non-limiting examples of radiation sources 728 include lasers, light emitting diodes (LEDs), light emitting capacitors (LECs), flash lamps, antennas, and the like. In some cases, radiation detector 732 may be configured to detect light and/or radiation that has interacted directly or indirectly with at least a portion of at least an inspirate 708. Non-limiting examples of radiation detectors 732 include photodiodes, photodetectors, thermopiles, pyrolytic detectors, antennas, and the like. In some cases, a radiation amount detected by radiation detector 732 may be indicative of a concentration of a particular gas in at least a portion of at least an inspirate 708. For example, in some exemplary embodiments, radiation source 728 may include an infrared light source operating at a wavelength about 4.6 μm and radiation detector may include a photodiode sensitive over a range encompassing 4.6 μm. An exemplary infrared light source may include an LED comprising InAsSb/InAsSbP heterostructures, for example LED46 from Independent Business Scientific Group (IBSG) of Saint Petersburg, Russia. An exemplary infrared detector may include a mercury cadmium telluride photodiode, for example UM-I-6 HgCdTe from Boston Electronics of Brookline, Massachusetts. In some cases, an amount of radiation at least a specific wavelength absorbed, scatter, attenuated, and/or transmitted may be indicative of a gas concentration.

With continued reference to FIG. 7, in some cases, inspirate concentration sensor 720 may include an infrared point sensor. An infrared (IR) point sensor may use radiation passing through a known volume of gas, for example at least an inspirate 708. In some cases, detector 732 may be configured to detect radiation after passing through gas at a specific spectrum. As energy from infrared may be absorbed at certain wavelengths, depending on properties of at least an inspirate 720. For example, carbon monoxide absorbs wavelengths of about 4.2-4.5 μm. In some cases, detected radiation within a wavelength range (e.g., absorption range) may be compared to a wavelength outside of the wavelength range. A difference in detected radiation between these two wavelength ranges may be found to be proportional to a concentration of gas present. In some embodiments, an infrared image sensors may be used for active and/or passive imaging. For active sensing, radiation source 728 may include a coherent light source (e.g., laser) which may be scanned across a field of view of a scene and radiation detector 732 may be configured to detect backscattered light at an absorption wavelength of a specific target gas. In some cases, radiation detector 732 may include an image sensor, for example a two-dimensional array of radiation sensitive devices, for example arranged as pixels. Passive IR imaging sensors may measure spectral changes at each pixel in an image and look for specific spectral signatures that indicate presence and/or concentration of target gases.

With continued reference to FIG. 7, in some cases, inspirate gas concentration sensor 720 may include an oxygen sensor. An exemplary oxygen sensor may include an electro-galvanic sensor. For example, an electro-galvanic oxygen sensor may be used to measure a concentration of oxygen within at least an inspirate 708. In some cases, an electro-galvanic oxygen sensor may include a lead/oxygen galvanic cell, within which oxygen molecules are dissociated and reduced to hydroxyl ions at a cathode. Hydroxyl ions may diffuse through an electrolyte and oxidize a lead anode. A current proportional to a rate of oxygen consumption may be generated when cathode and anode are electrically connected through a resistor. Current may be sensed by known current sensing methods, for example without limitation those described in this disclosure, to produce an electrical signal proportional to a concentration of oxygen, for example oxygen within at least an inspirate. Another exemplary oxygen sensor may include a lambda sensor, for example a zirconia sensor, a wideband zirconia sensor, and/or a titania sensor. A lambda sensor may be configured to sense a quantity of oxygen in a gas (e.g., at least an inspirate 708) relative another gas, for example air within an environment (e.g., cabin air) and transmit an analog voltage correlated to the sensed relative quantity of oxygen. Analog voltage transmitted by a lambda sensor may be processed by any data or signal processing methods discussed herein, for example through amplification and/or analog-to-digital conversion.

In another exemplary embodiment, inspirate concentration sensor 720 may include an optical sensor configured to sense oxygen concentration. In some cases, a chemical film is configured to be in contact with a gas (e.g., at least an inspirate 708). Chemical film may have fluorescence properties which are dependent upon presence and/or concentration of oxygen. Radiation detector 732 may be positioned and configured, such that it is in sensed communication with chemical film. Radiation source 728 may irradiate and/or illuminate chemical film with radiation and/or light having properties (e.g., wavelength, energy, pulse duration, and the like) consistent with exciting fluorescence within the chemical film. In some cases, fluorescence may be at a maximum when there is no oxygen present. For example, oxygen molecules may collide with chemical film and quench photoluminescence resulting from fluorescent excitation. A number of $O_2$ molecules colliding with chemical film may be correlated with a concentration of oxygen within a gas (e.g., inspirate 708). Fluorescence properties as sensed by optical detector 732 may therefore be related to oxygen concentration. Fluorescence properties may include emission duration, fluorescence energy, and the like. In some cases, detected optical signal (fluorescence) to oxygen concentration may not be linear. For instance, an optical oxygen sensor may be most sensitive at low oxygen concentration; that is, sensitivity decreases as oxygen concentration increases, following a known Stern-Volmer relationship. In some cases, an optical oxygen sensor is advantageous as substantially no oxygen may be consumed, during sensing. In some cases, planar optical oxygen sensors (i.e., optodes) may be used to detect a spatial distribution of oxygen concentrations over an area, for example as a two-dimensional image. Based on the same principle, radiation detector 732 may include a digital camera that may be used to capture fluorescence intensities over a specific area.

With continued reference to FIG. 7, inhalation sensor module 716 may include at least an inspirate pressure sensor 724, which is fluidic communication with at least an inspirate 708, for example by way of at least a fluidic channel 712. In some cases, at least an inspirate pressure sensor 716 may be configured to sense and transmit at least an inspirate pressure parameter as a function of a pressure of at least an inspirate 708. In some cases, inhalation pressure sensor 724 may include any type of pressure sensor described in this disclosure. Inhalation pressure sensor 724 may be a force collector type pressure sensor. Alternatively, in some case, inhalation pressure sensor 724 may be a pressure sensor type that does not use force collection. Further disclosure related to inhalation sensor may be found in U.S. patent application Ser. No. 17/333,169, entitled "SYSTEMS AND METHODS FOR INSPIRATE SENSING TO DETERMINE A PROBABILITY OF AN EMERGENT PHYSIOLOGICAL STATE," the entirety of which is incorporated herein by reference.

Figure 8:
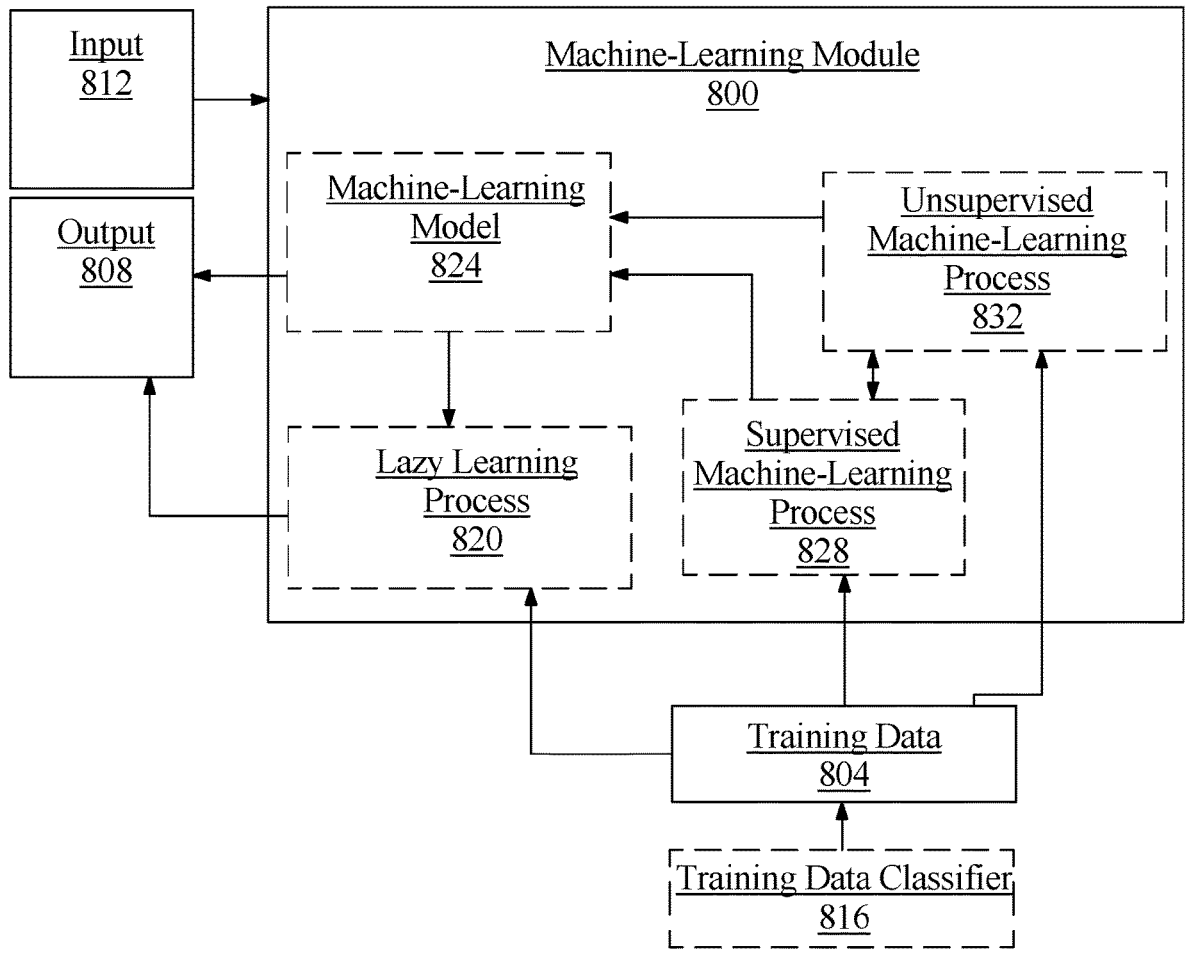
FIG. 8 is a block diagram of an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example inputs may include respiration parameters and outputs may include respiratory patterns, respiratory phase, and/or actuator control scheme. Exemplary non-limiting respiration parameters include exhalation carbon dioxide content, inhalation flow, exhalation flow, and the like. Exemplary non-limiting respiratory phases include inhalation, exhalation, pausing, and the like.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to altitude, environmental oxygen content, or the like. For example, in some cases, control of actuator may be performed differently at different altitudes. Training data classifier 816 may classify elements of training data based upon user, as well. For example, different user's may require or benefit from individualized training data or training data associated with their cohort. For instance, fighter pilots may have different training data than cargo pilots or helicopter pilots.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include respiration parameters as described above as inputs, actuator control signals as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 9:
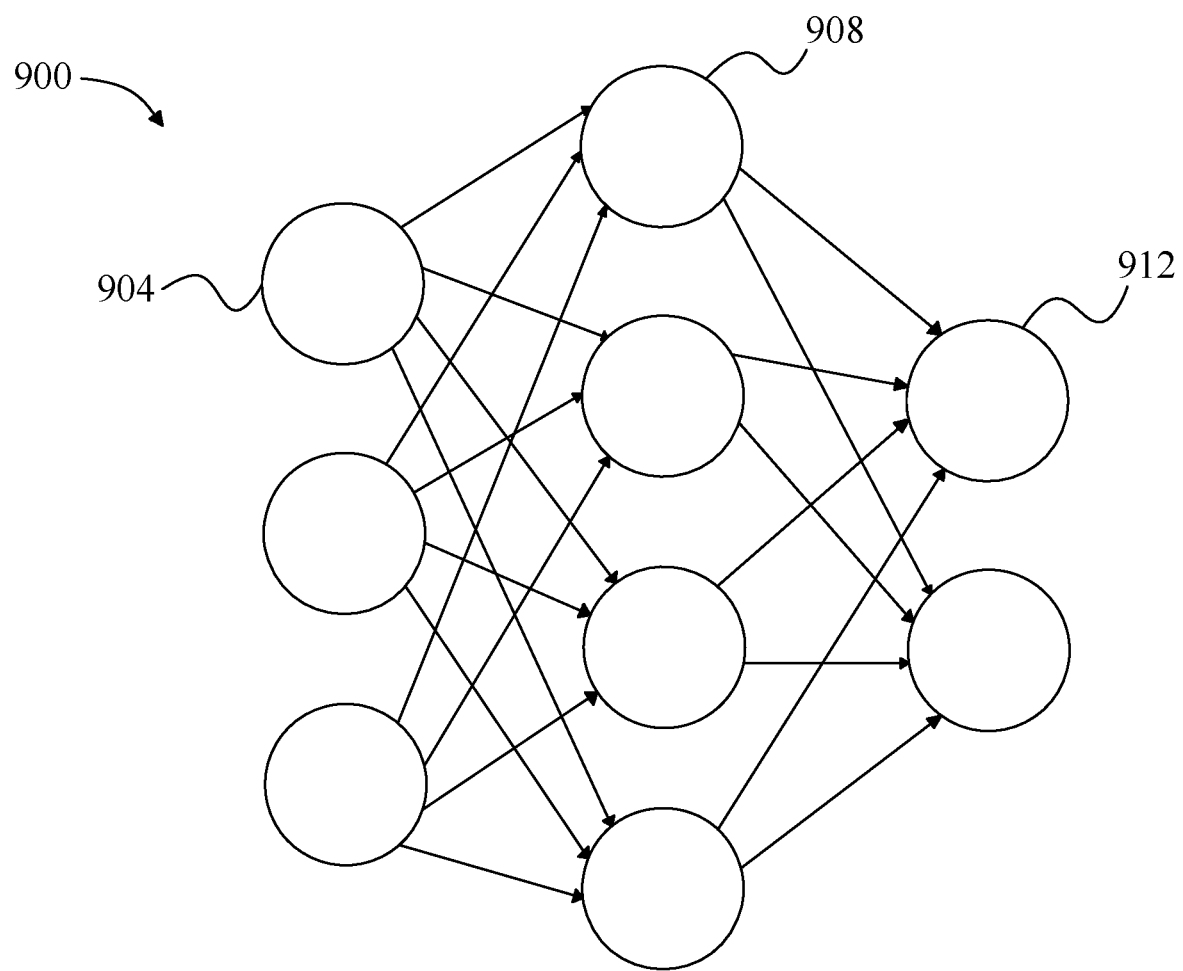
FIG. 9 is a schematic diagram of an exemplary embodiment of a neural network.

Referring now to FIG. 9, an exemplary embodiment of neural network 900 is illustrated. A neural network 900 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 10:
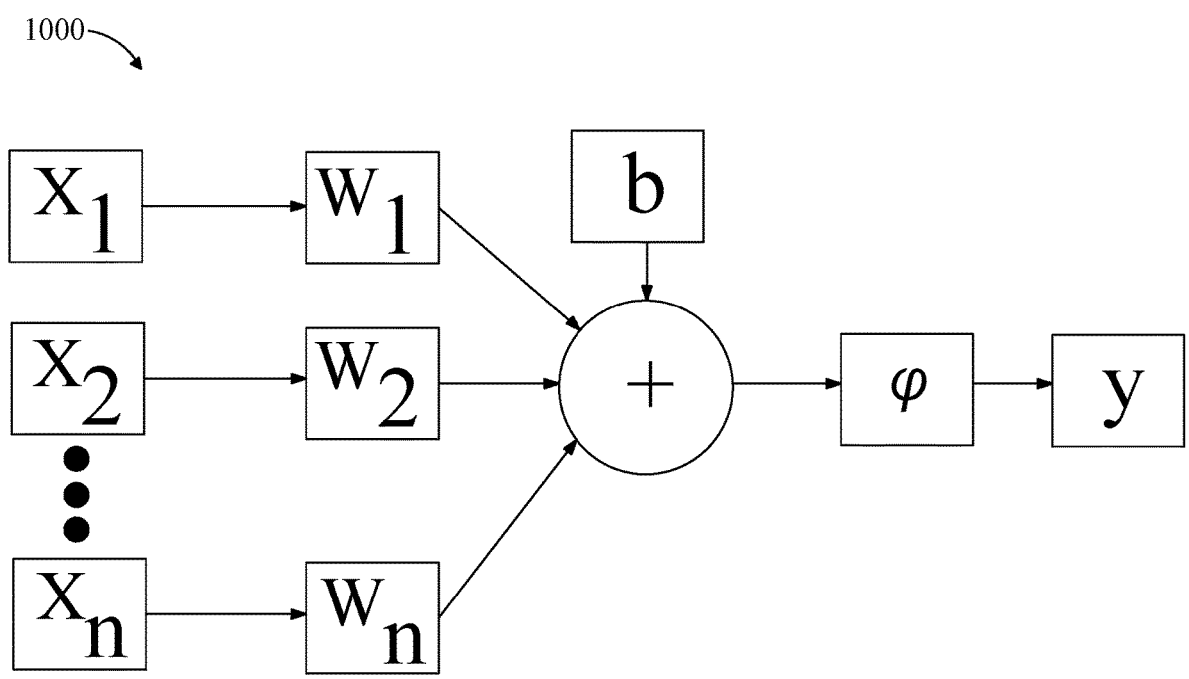
FIG. 10 is a schematic diagram of an exemplary embodiment of a node of a neural network.

Referring now to FIG. 10, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 11:
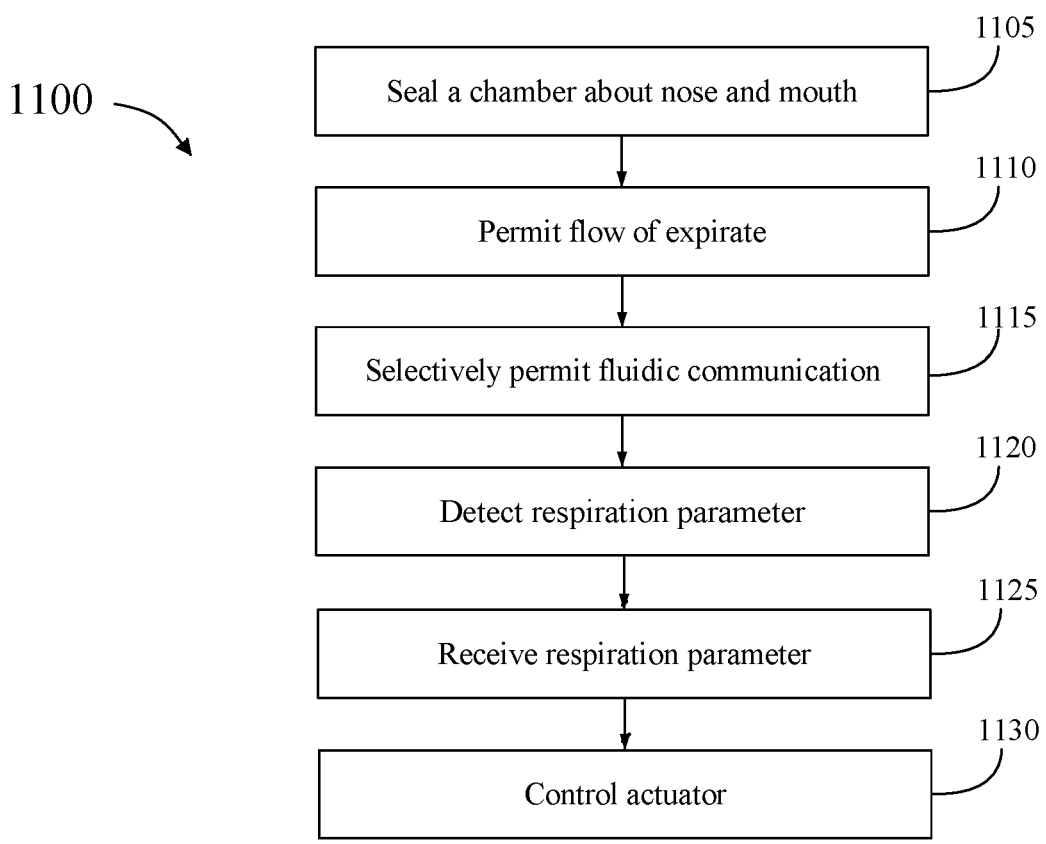
FIG. 11 is a flow diagram of an exemplary method of detecting imminent loss of consciousness.

Referring now to FIG. 11, an exemplary method 1100 of use of a respiration system for a reduced oxygen environment is illustrated by way of flow chart. Respiration system may include any respiration system described in this disclosure, for example with reference to FIGS. 1-10. Reduced oxygen environment may include any reduced oxygen environment described in this disclosure, for example with reference to FIGS. 1-10. At step 1105, method 1100 includes substantially sealing, using a face mask, a chamber about a nose and mouth of a user. Face mask may include any face mask described in this disclosure, for example with reference to FIGS. 1-10.

With continued reference to FIG. 11, at step 1110, method 1100 may include permitting, using an exhalation system in fluidic communication with face mask, flow of expirate from user. Exhalation system may include any exhalation system described in this disclosure, for example with reference to FIGS. 1-10.

With continued reference to FIG. 11, at step 1115, step 1110 may additionally include selectively permitting, using a valve having an actuator operatively connected to valve, fluidic communication with chamber as a function of chamber pressure. Valve may include any valve described in this disclosure, for example with reference to FIGS. 1-10. Actuator may include any actuator described in this disclosure, for example with reference to FIGS. 1-10. In some embodiments, valve may include a normally-closed valve configured to open at a release pressure. Normally-closed valve may include any normally-closed valve described in this disclosure, for example with reference to FIGS. 1-10. In some cases, valve may be spring loaded. In some cases, valve may be configured to operate after failure of one or more of actuator and computing device. In some cases, actuator may include a solenoid. Solenoid may include any solenoid described in this disclosure, for example with reference to FIGS. 1-10.

With continued reference to FIG. 11, at step 1120, step 1110 may additionally include detecting, using a respiration sensor, a respiration parameter associated with a respiration phenomenon. Respiration sensor may include any sensor described in this disclosure, for example with reference to FIGS. 1-10. Respiration parameter may include any parameter described in this disclosure, for example with reference to FIGS. 1-10. Respiration phenomenon may include any phenomenon described in this disclosure, for example with reference to FIGS. 1-10.

With continued reference to FIG. 11, at step 1125, method 1100 may include receiving, using a computing device in communication with actuator and respiration sensor, respiration parameter.

With continued reference to FIG. 11, at step 1130, method 1100 may include controlling, using computing device, actuator. In some embodiments, method 1100 may additionally include controlling, using computing device, actuator to reduce release pressure as a function of respiration parameter. Release pressure may include any release pressure described in this disclosure, for example with reference to FIGS. 1-10. In some embodiments, method 1100 may additionally include variably controlling, using computing device, an actuator force exerted by actuator. Actuator force may include any actuator force described in this disclosure, for example with reference to FIGS. 1-10.

Still referring to FIG. 11, in some embodiments, method 1100 may additionally include supplying, using an inhalation system in fluidic communication with face mask, inhalation air to the face mask. Inhalation system may include any inhalation system described in this disclosure, for example with reference to FIGS. 1-10. Inhalation air may include any inhalation air described in this disclosure, for example with reference to FIGS. 1-10. In some cases, inhalation system may additionally include a supply regulator, and method 1100 may additionally include controlling, using computing device, the supply regulator as a function of respiration parameter. Supply regulator may include any supply regulator described in this disclosure, for example with reference to FIGS. 1-10.

Still referring to FIG. 11, in some embodiments, method 1100 may additionally include determining, using computing device, a respiratory pattern as a function of respiration parameter. Respiratory pattern may include any respiratory pattern described in this disclosure, for example with reference to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
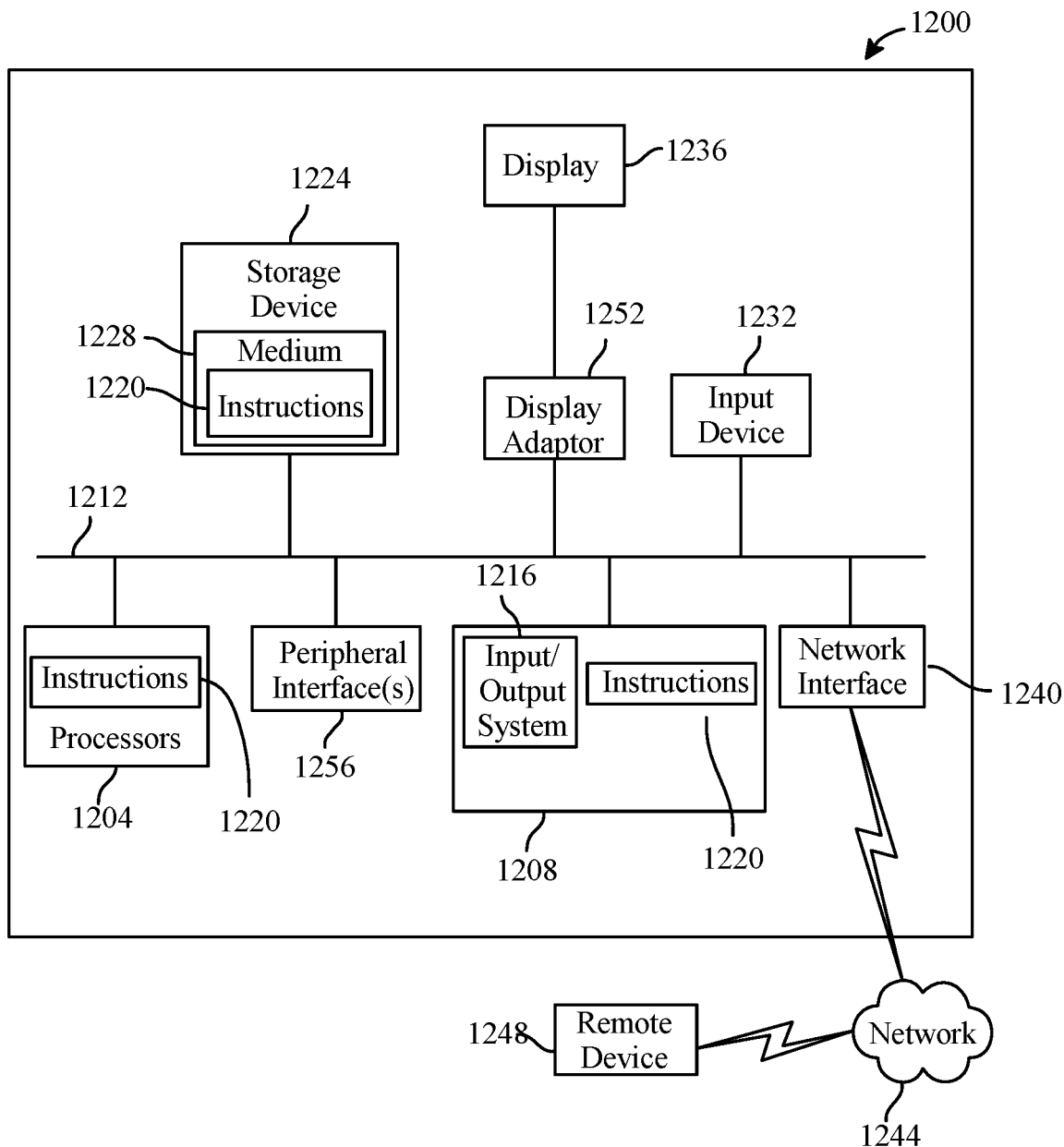
FIG. 12 is a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A respiration system, the system comprising:
    a face mask configured to substantially seal a chamber about a nose and a mouth of a user;
    an exhalation system in fluidic communication with the face mask and configured to permit flow of expirate from the user, wherein the exhalation system further comprises: a valve selectively permitting fluidic communication with the chamber as a function of chamber pressure, wherein the valve comprises a normally-closed valve configured to open at a release pressure; and
    an actuator operatively connected to the valve;
    a respiration sensor configured to detect a respiration parameter associated with a respiration phenomenon, wherein the respiration parameter comprises a carbon dioxide level; and
    a computing device in communication with the actuator and the respiration sensor,
    wherein the computing device is configured to:
    receive the respiration parameter; and control the actuator to reduce the release pressure as a function of the respiration parameter.

2. The system of claim 1, wherein the valve is spring-loaded.

3. The system of claim 1, wherein the normally-closed valve is configured to operate after failure of the actuator and the computing device.

4. The system of claim 1, wherein the actuator comprises a solenoid.

5. The system of claim 1, wherein the computing device is further configured to variably control an actuator force exerted by the actuator.

6. The system of claim 1, further comprising an inhalation system in fluidic communication with and configured to supply inhalation air to the face mask.

7. The system of claim 6, wherein the inhalation system further comprises a supply regulator and the computing device is further configured to control the supply regulator as a function of the respiration parameter.

8. The system of claim 1, wherein the computing device is further configured to determine a respiratory pattern as a function of the respiration parameter.

9. A method of use of a respiration system for a reduced oxygen environment, the method comprising:
   substantially sealing, using a face mask, a chamber about a nose and a mouth of a user;
   permitting, using an exhalation system in fluidic communication with the face mask, flow of expirate from the user, wherein permitting the flow further comprises:
   selectively permitting, using a valve having an actuator operatively connected to the valve, fluidic communication with the chamber as a function of chamber pressure, wherein the valve comprises a normally-closed valve configured to open at a release pressure; and
   detecting, using a respiration sensor, a respiration parameter associated with a respiration phenomenon, wherein the respiration parameter comprises a carbon dioxide level; and
   receiving, using a computing device in communication with the actuator and the respiration sensor, the respiration parameter; and
   controlling, using the computing device, the actuator to reduce the release pressure as a function of the respiration parameter.

10. The method of claim 9, wherein the valve is spring loaded.

11. The method of claim 9, wherein the normally-closed valve is configured to operate after failure of the actuator and the computing device.

12. The method of claim 9, wherein the actuator comprises a solenoid.

13. The method of claim 9, further comprising variably controlling, using the computing device, an actuator force exerted by the actuator.

14. The method of claim 9, further comprising supplying, using an inhalation system in fluidic communication with the face mask, inhalation air to the face mask.

15. The method of claim 14, wherein the inhalation system further comprises a supply regulator and the method further comprises controlling, using the computing device, the supply regulator as a function of the respiration parameter.

16. The method of claim 9, further comprising determining, using the computing device, a respiratory pattern as a function of the respiration parameter.

* * * * *